W. Siar,
Calipers.

No. 99,961.      Patented Feb. 15, 1870.

Witnesses.
E. W. Anderson
Q. Q. Kane

Inventor
William Siar
Chipman Hosmer & Co.
Attorneys.

United States Patent Office.

WILLIAM SIAR, OF FRANKLIN, PENNSYLVANIA.

Letters Patent No. 99,961, dated February 15, 1870.

IMPROVEMENT IN CALIPERS.

The Schedule referred to in these Letters Patent and making part of the same

*To all whom it may concern:*

Be it known that I, WILLIAM SIAR, of Franklin, in the county of Venango, and State of Pennsylvania, have invented a new and valuable Improvement in Calipers; and I do hereby declare that the following is a full, clear, and exact description of the construction and operation of the same, reference being had to the annexed drawings making a part of this specification and to the letters and figures of reference marked thereon.

Figure 1:
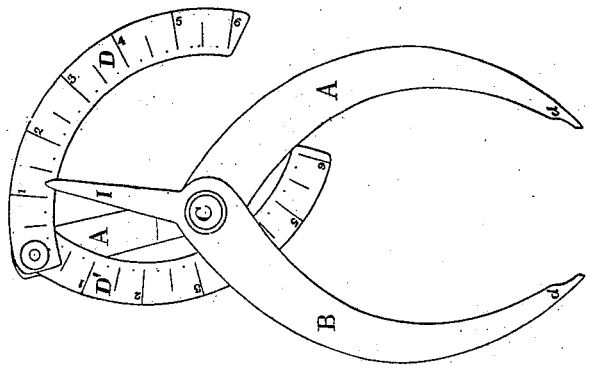

Figure 1 of the drawings is a representation of my invention as applied to determine the diameter of a solid.

Figure 2:
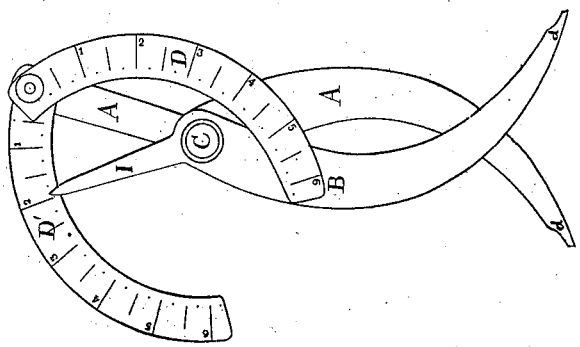

Figure 2 is a representation of my invention as applied to determine the width of a cavity or bore.

My invention relates to calipers, and consists mainly in the construction and novel arrangement of the graduated folding arcs and pointer attached to a pair of calipers, whereby the distance through any object, as well as the diameter of any cavity or bore, can be ascertained in inches, at sight, when the instrument is applied.

The letter A of the drawings designates one arm of the calipers, and the letter B the other.

Pivoted to the end of the arm A, which is extended a short distance above the pivot C of the calipers, are two graduated arcs, D and D'. The scale usually employed is that of inches, their eighth parts and sixteenths.

The other arm B of the calipers is extended up from the central pivot C, and brought to a point, forming a pointer or indicator.

When it is desired to measure the distance through a solid object, the points *d d* of the calipers are placed one on each side of it. The arc D being extended until its center is over or nearly over the central point of the pivot C, the indicator I will designate the distance measured in inches and parts of an inch.

When it is desired to measure the diameter of a cavity or the bore of a tube, the points *d d* are crossed and inserted therein, and then separated until they touch the walls on each side, when the arc D', being properly extended, the indicator I will show the measured diameter in inches and parts of an inch.

It is apparent from the above description that my invention possesses great advantages in point of simplicity, usefulness, and cheapness. No more metal is employed than is actually necessary to form the parts. The arcs fold up, so that when not in use the calipers can be put away in small compass. In measuring internal diameters, the calipers can be introduced beyond the rivet which fastens the legs together, and as far as the arcs themselves.

What I claim as my invention, and desire to secure by Letters Patent, is—

The calipers herein described, having the folding graduated arcs D D' pivoted to the arm A, and extending out, one on each side of it, and the pointer I attached to the arm B, all constructed and arranged to measure the internal as well as the external diameters of objects, as specified.

In testimony that I claim the above, I have hereunto subscribed my name, in the presence of two witnesses.

WM. SIAR.

Witnesses:
PATRICK CANNING,
J. R. CAMPBELL.